(12) United States Patent
Fåhraeus et al.

(10) Patent No.: US 7,239,306 B2
(45) Date of Patent: Jul. 3, 2007

(54) ELECTRONIC PEN

(75) Inventors: Christer Fåhraeus, Lund (SE); Johan Lindgren, Lund (SE); Stefan Burström, Lund (SE)

(73) Assignee: Anoto IP LIC Handelsbolag, Lund (SE)

( * ) Notice: Subject to any disclaimer, the term of this patent is extended or adjusted under 35 U.S.C. 154(b) by 683 days.

(21) Appl. No.: 10/141,962

(22) Filed: May 10, 2002

(65) Prior Publication Data
US 2002/0175903 A1 Nov. 28, 2002

Related U.S. Application Data

(60) Provisional application No. 60/290,126, filed on May 11, 2001.

(51) Int. Cl.
*G09G 5/00* (2006.01)
(52) U.S. Cl. .................................. 345/179; 178/19.01
(58) Field of Classification Search ................ 345/179, 345/163; 358/471–474, 478, 482, 539; 235/472.01, 235/462.44; 382/312–314, 317; 178/19.01–19.05; 708/107
See application file for complete search history.

(56) References Cited

U.S. PATENT DOCUMENTS

| 4,142,788 | A * | 3/1979 | Matsumoto et al. ........ 396/129 |
| 5,012,049 | A | 4/1991 | Schier |
| 5,193,897 | A | 3/1993 | Halsey |
| 5,294,792 | A | 3/1994 | Lewis et al. |
| 5,434,371 | A | 7/1995 | Brooks |
| 5,483,052 | A * | 1/1996 | Smith et al. ........... 235/462.49 |
| 5,750,939 | A * | 5/1998 | Makinwa et al. ........ 178/18.01 |
| 5,852,434 | A | 12/1998 | Sekendur |
| 6,104,388 | A | 8/2000 | Nagai et al. |
| 6,130,666 | A | 10/2000 | Persidsky |
| 6,305,608 | B1 | 10/2001 | Nada et al. |
| 6,348,914 | B1 * | 2/2002 | Tuli ........................... 345/179 |
| 6,577,299 | B1 * | 6/2003 | Schiller et al. ............. 345/179 |
| 6,633,282 | B1 * | 10/2003 | Monroe ...................... 345/179 |
| 2003/0107558 | A1 * | 6/2003 | Bryborn et al. ............. 345/179 |

FOREIGN PATENT DOCUMENTS

| RO | 435031 A * | 7/2000 |
| WO | WO 98/20446 | 5/1998 |

(Continued)

OTHER PUBLICATIONS

"Electric Pen With a Retractable Writing Tip, Activating on/off Function"; Research Disclosure; Jul. 2000; RD435037; p. 1183.

*Primary Examiner*—Regina Liang
(74) *Attorney, Agent, or Firm*—Birch, Stewart, Kolasch & Birch, LLP

(57) ABSTRACT

An electronic pen has a body, a cap and an actuation device. The actuation device comprises a sensor arrangement for sensing presence or absence of the cap on the body. The actuation device is operable to activate the electronic pen in response to removal of the cap from the body or in response to placement of the cap on a portion separated from a front end portion of the body. The actuation device is further operable to deactivate the electronic pen in response to placement of said cap on said body. Methods for activating and deactivating an electronic pen are also described.

32 Claims, 3 Drawing Sheets

FOREIGN PATENT DOCUMENTS

| | | |
|---|---|---|
| WO | WO 00/11596 | 3/2000 |
| WO | WO 00/73981 A1 | 12/2000 |
| WO | WO 00/73983 A1 | 12/2000 |
| WO | WO 01/16691 A1 | 3/2001 |
| WO | WO 01/26032 A1 | 4/2001 |
| WO | WO 01/30589 A1 | 5/2001 |
| WO | WO 01/61636 A2 | 8/2001 |

* cited by examiner

ELECTRONIC PEN

This application claims priority on provisional Application No. 60/290,126 filed on May 11, 2001, the entire contents of which are hereby incorporated by reference.

TECHNICAL FIELD

The present invention relates to an electronic pen having a body and a cap. The invention also relates to a method of activating an electronic pen and a method of deactivating an electronic pen.

BACKGROUND ART

Electronic pens are known having sensors and electronic devices for digitally recording what is written with the pen. Different kinds of sensors may he arranged in the pen for determining its position, e.g. acceleration sensors, as described in U.S. Pat. No. 5,434,371 and U.S. Pat. No. 6,130,666, optical sensors, as described in U.S. Pat. No. 5,294,792, U.S. Pat. No. 5,852,434 and WO 00/73983, pressure sensors, as described in U.S. Pat. No. 6,104,388, or mechanical sensors, as described in U.S. Pat. No. 5,294,792 and U.S. Pat. No. 6,130,666. In still other types of electronic pens, triangulation of signals (e.g. light, sound, IR radiation etc) is used for position determination, such as described in U.S. Pat. No. 5,012,049.

It would be desirable to find a way of activating and deactivating such electronic pens and electronic pens of other types in a manner that is easy and intuitive for the user.

SUMMARY OF THE INVENTION

An object of the present invention is to further simplify and improve the use of an electronic pen, particularly by making it easier to activate and deactivate the same.

This object is achieved by means of a pen according to claims 1, 2 and 3, a method of activating an electronic pen according to claims 24 and 28 and a method of deactivating an electronic pen according to claim 26, preferred embodiments and variants being defined in subclaims related thereto.

The pen according to the present invention utilises a cap for easily activating and deactivating an electronic pen. The electronic pen is further provided with a sensor arrangement for detecting the presence or absence of the cap.

According to one embodiment of the invention, the sensor arrangement comprises a mechanical switch. This has the main advantage of not using any electric power for the switching process. The use of a mechanical switch provides high reliability of operation. The wide selection of standard components makes this solution simple and inexpensive to manufacture.

According to another embodiment of the invention, the sensor arrangement comprises an electric switch. This is also a solution that does not require any electric power since an electric switch is a passive component, According to another embodiment, the sensor arrangement is contactlessly operable. This gives the advantage of not having to make openings in the cover of the body, thus increasing the structural strength of the pen and reducing the risk of dust and moisture entering the body, thereby making the pen more robust. The closed cover also gives the advantage of an increased resistance to electric shock.

The contactlessly operable sensor arrangement may comprise a motion sensor. This has the advantage that the motion sensor can be placed anywhere in the pen, thus simplifying the assembly of the pen.

According to still another embodiment, the contactlessly operable sensor arrangement comprises a light sensor. This provides a convenient and secure way of detecting the presence or absence of the cap.

According to a preferred embodiment, the light sensor is a solid state imaging device, such as a camera. It is preferred that this camera is a camera that is usable for registration of information during operation of the electronic pen. This gives the advantage of not having to add extra components to the pen, thus lowering the size, weight and cost of the pen.

In another embodiment of the invention, the contactlessly operable sensor arrangement comprises a pressure sensor in addition to the above-mentioned light sensor. This gives the advantage of an even more secure determination of the presence or absence of the cap.

This pressure sensor is preferably also usable for sensing when a writing implement in the pen is pressed against a writing surface. This is convenient since it minimises the number of components in the pen.

According to one embodiment, the contactlessly operable sensor arrangement utilises changes in a magnetic field for detecting the presence or absence of the cap. This provides a reliable and durable detection solution.

One way of utilising the magnetic field is to use a reed switch. In one embodiment, the reed switch is arranged in the body and a magnet is arranged in the cap. This provides a simple and reliable solution using standard components. This is also an energy-saving solution, since the reed switch is a passive component.

Another way of utilising changes in a magnetic field is to use a Hall element. In one embodiment, the Hall element is arranged in the body and a magnet is arranged in the cap. This provides a space-saving solution since the Hall element and magnet can be made small. It is possible to choose a Hall element, the characteristics of which are not sensitive to changes in temperature, thus making it a reliable solution, and since it is not easily worn out by use, it is also a durable solution. Hall elements are standard components on the market and simple to mount, which simplifies the manufacture of the pen.

In one embodiment, the magnet is arranged underneath a clip on the cap. This is advantageous since it gives more space for the magnet on the cap since it is possible to locally increase the cap wall thickness, without changing the overall appearance of the cap, to form a pocket holding the magnet. Further, the clip can be made from a magnetically shielding material, such as a ferritic material, to minimise the magnetic field around the pen, thereby protecting magnetic strips on e.g. credit cards kept in the vicinity of the pen from being affected by the magnetic field of the magnet.

In another embodiment of the invention, a field concentrator, such as an element of ferritic material, is arranged adjacent to said Hall element. This is advantageous since it allows for the use of a smaller magnet in the cap. A field concentrator also gives the possibilities of putting the magnet at a larger distance from the Hall element and of reducing the need for accuracy in the placement of the magnet opposite the Hall element. In a specific embodiment, a magnet is arranged adjacent to the Hall element to provide an amplified background magnetic field, making it possible to switch the Hall element with a weaker magnetic field.

In another embodiment of the invention, the sensor arrangement comprises a vibration sensor. This is a stable and durable solution, and it also has the advantage of not being affected by electric and magnetic interference.

The above-related advantages are also achieved by the methods according to the invention.

BRIEF DESCRIPTION OF THE DRAWINGS

The invention and its many advantages will now be further described, reference being made to the accompanying drawings showing presently preferred, exemplifying embodiments.

DETAILED DESCRIPTION OF PREFERRED EMBODIMENTS

The following description is focused on an electronic pen that is designed for position-determination based on optical registration of a position-coding pattern on a writing surface. The basic features of the pen and the pattern are further disclosed in the patent publications WO 00/73981, WO 01/16691, and WO 01/26032, all of which are incorporated herein by this reference. It is to be understood, however, that the invention is not restricted to the illustrated pen, but can be employed with any type of electronic pen, including the types given by way of introduction, as well as other pen-shaped reading devices, such as the one disclosed in WO 98/20446.

Figure 1:
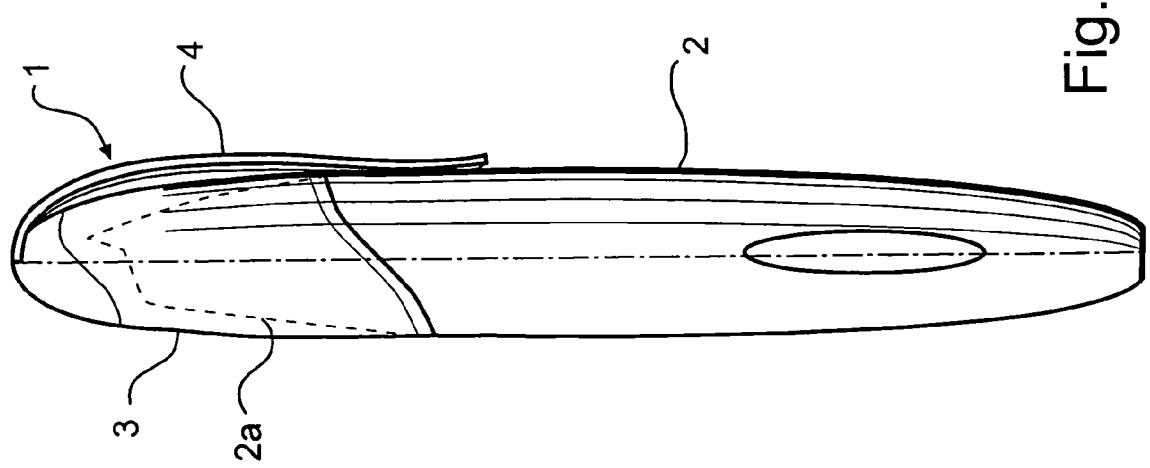
FIG. 1 shows an electronic pen according to the invention.

Referring to FIG. 1, the electronic pen 1 of the invention has a body 2 and a cap 3 with a clip 4. The cap 3 is placed on a front end portion 2a of the body 2. The cap 3 can be any form of means used to cover the front end portion 2a of the pen 1 that is being used for recording information during use of the pen 1.

Figure 2:
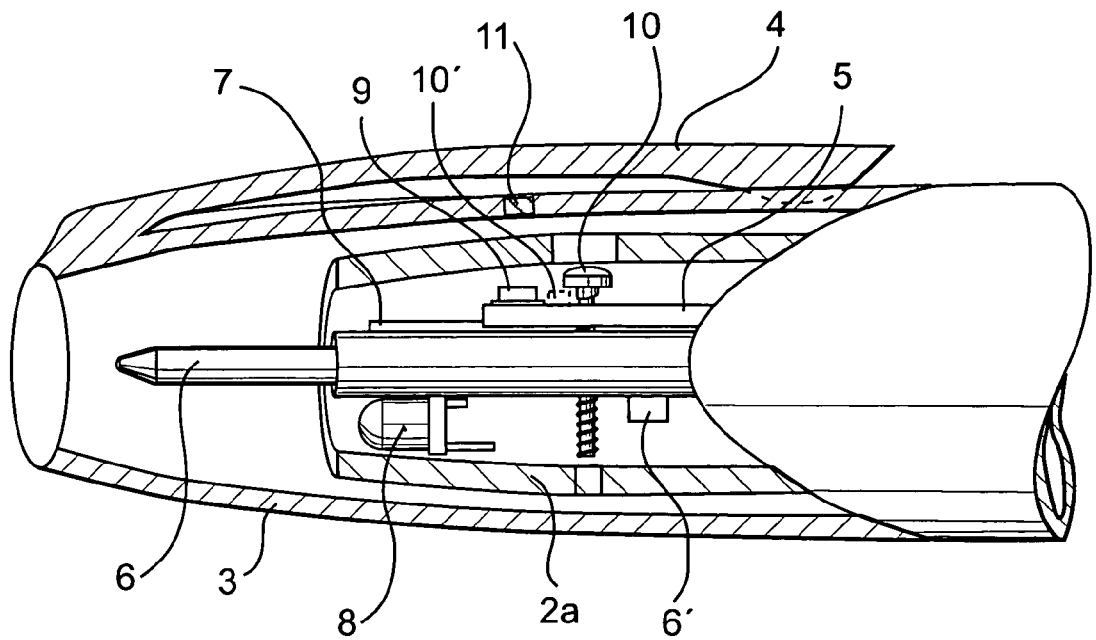
FIG. 2 shows, on a larger scale, a section through a cap and part of a body of the electronic pen in FIG. 1.

Inside the body 2, a circuit board 5 is arranged (see FIG. 2). A writing implement, e.g. an ink cartridge 6, a solid state imaging device, such as a CMOS or CCD camera 7, and a light emitting diode (LED) 8 are also arranged in the front end portion 2a of the body 2. On the circuit board 5, a Hall element 9 and a ferritic element, in this case a screw 10, are mounted next to each other.

Figure 4:
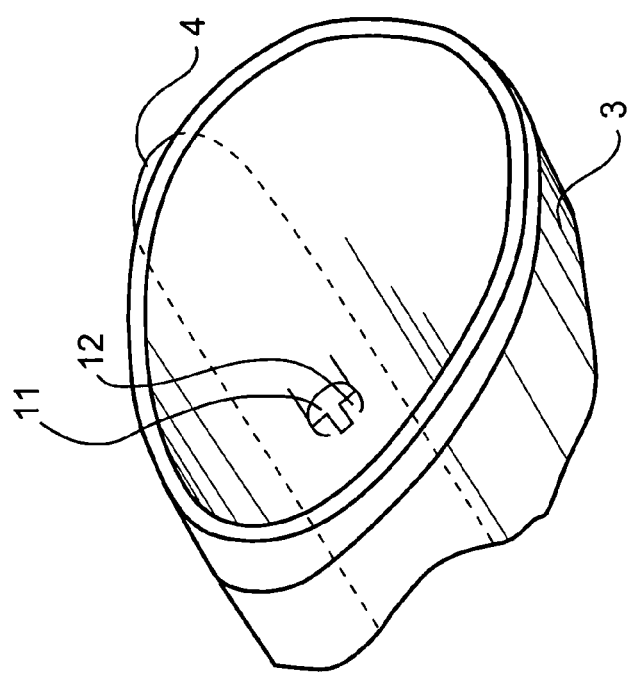
FIG. 4 is a partially transparent perspective view of the inside of the cap.
Figure 3:
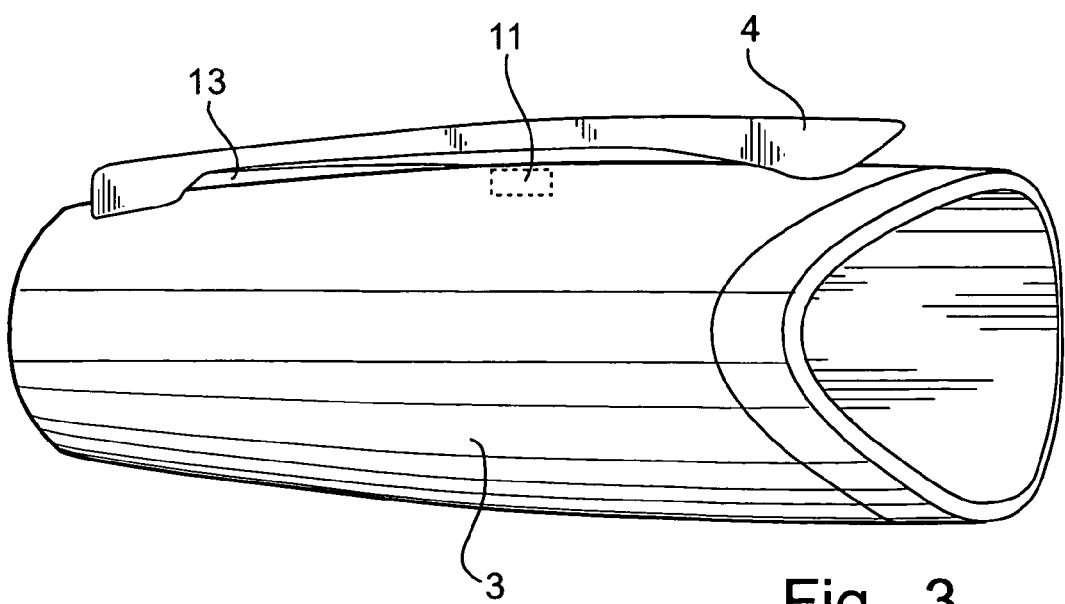
FIG. 3 is a partially transparent side view of the cap.

As can be seen in FIG. 4, the cap 3 is provided with a magnet 11 which is placed underneath the clip 4 in a recess 12 on the inside of the cap 3. To allow for production of a cap with thin walls, which might be advantageous from both a cost and weight perspective, an elongate ridge or bulge 13 of locally increased material thickness is formed in the side wall of the cap 3 directly underneath the clip 4, as shown in FIG. 3. Thus, a recess of dimensions adequate for accommodating a relatively bulky magnet can be formed in the bulge 13. This can be accomplished without affecting the design or contour of the pen, since the bulge 13 is essentially hidden underneath the clip 4.

It is also possible to use a ring magnet mounted in the cap or to mould magnetic material into the cap 1, e.g. using injection moulding, in which magnetic material is mixed with a polymer and moulded into a cap, or insert moulding, in which polymer material is moulded around a magnet.

The cap 3 covers the tip of the ink cartridge 6 when placed on the front end portion 2a of the body 2. This cap 3 may be removed from the body 2 of the pen 1. Prior to use of the pen 1 the cap 3 is removed. Removal of the cap 3 activates the pen 1.

The activation can be achieved in two stages, i.e. the pen 1 is put in a stand-by mode when the cap 3 is removed, and is activated completely when the tip of the ink cartridge 6 is pressed against a writing surface as sensed by a cartridge sensor 6' associated with the ink cartridge 6 (FIG. 2). The cartridge sensor 6' may be an electromechanical pressure sensor, or an optical or magnetic sensor for detecting movement of the cartridge.

The pen 1 being in stand-by mode may e.g. imply that a main processor P in the pen 1 is activated, while the camera 7 and the LED 8 are still inactive. In case the pen communicates with an external device, such as a PDA, computer or mobile phone, over a wired or wireless interface, such as short-range radio, inductive coupling or infrared light, the pen may connect to the external device in the stand-by mode, to thereby streamline the operation of the pen.

The pen being completely activated may e.g. imply that the camera 7 is active and that the LED 8 is turned on to illuminate the writing surface.

Alternatively, the stand-by mode may be omitted so that the pen 1 is completely activated when the cap 3 is being taken off.

The activation is performed by the use of a sensor arrangement. The sensor arrangement is exemplified as a Hall element 9 and a magnet 11. An actuation device for the pen comprises the sensor arrangement and any other form of equipment in the pen used for activating the pen.

When the cap 3 is removed, the magnet 11 is distanced from the Hall element 9 causing a change in the magnetic field affecting the Hall element 9. In one embodiment, the Hall element 9 has an internal controller which periodically, typically 10–20 times per second, draws an electrical current through a measurement area in the Hall element, the measurement area being arranged essentially perpendicular to the magnetic field to be detected. In the presence of a magnetic field, this electrical current results in a voltage difference between electrodes on opposite sides of the measurement area. The voltage difference is output on a port which is connected to the main processor P of the pen. The main processor P controls, i.a., the operation of the camera 7, the LED 8, any transceiver for communication with external devices, etc, and also receives an output signal from the cartridge sensor 6'.

A given change in the voltage difference output from the Hall element 9 causes the main processor P, for example by receiving a signal change on an interrupt port, to be activated and to subsequently activate other equipment in the pen as described above.

It is possible to use other types of magnetic switches, for example reed switches.

The ferritic element 10 attracts the magnetic field and concentrates it around the Hall element 9, so that the magnet 11 in the cap 3 can be made small, for example with a thickness of approximately 1 mm and a diameter of 3 mm. Additionally or alternatively, a magnet 10' might be arranged adjacent to the Hall element 9 to enhance the magnetic field locally at the Hall element. Thereby, only a small increase in the magnetic field is needed to switch the Hall element 9. The placement of the magnet 11 in the recess 12 (FIG. 4) makes it easy to slide the magnet 11 into position, thus making the assembling of the cap 3 simple.

The clip 4 is arranged immediately above the recess 12, thus hiding the bulge 13 that makes it possible to form a recess 12 with adequate dimensions with respect to the size of the magnet 11. The clip 4 is made of ferritic material and therefore also shields the exterior of the cap from the magnetic field of the magnet 11, thus protecting magnetic strips of credit cards and the like from being affected by the magnetic field.

When the cap 3 is placed on the front end portion 2a of the pen 1, the magnetic field affecting the Hall element 9 changes as the magnet 11 approaches the Hall element 9. The resulting voltage change initiates a deactivation of the equipment in the pen 1. When the cap 3 is placed on the body 2, all equipment need not be immediately deactivated. It is possible that the pen 1 first completes ongoing processing of information.

In the embodiment described above, a contactlessly operable sensor arrangement is used to activate and deactivate the electronic pen 1.

The design of the cap 3 and the body 2 is such that the magnet 11 is placed directly above the Hall element 9 when the cap 3 is protecting the front end 2a. This can be achieved, for example, by the body and cap being noncircular in cross-section, for example elliptic, polygonal etc. Additionally, or alternatively, there might be provided co-operating guiding ribs and/or recesses on the cap and the pen body.

Instead of one or more magnetic field sensors, the pen may include sensors that use, for example, light or pressure changes to detect the presence or absence of the cap 3.

For example, a light sensor that is covered by the cap 3 when this is placed on the pen can be mounted on the front end 2a. When the cap 3 is removed, the light that is sensed by the light sensor causes the pen 1 to be activated.

In the illustrated case, with an optical pen, the camera 7 may be used as such a light sensor. Thus, the camera 7 is activated, at least periodically or intermittently, to sense if the cap 3 has been removed. To reduce power consumption, only one or a few image elements of the camera 7 may be activated for this purpose. To further reduce power consumption, the cap 3 can be designed to exert pressure on the ink cartridge 6 in the longitudinal direction thereof, so as to generate a corresponding output signal from the above-mentioned cartridge sensor 6'. Hereby, the intermittent activation of the camera/light sensor can be stopped when the cartridge sensor output signal has persisted at a given level for more than a given time limit.

When the cap 3 is removed, the pen 1 can be activated based on the signal from the cartridge sensor 6', or from the camera/light sensor if active. When the cap 3 is replaced, the pen 1 is deactivated based on the signal from the camera 7.

Further, the combination of camera and cartridge sensor has the additional advantage of preventing the pen from being deactivated by mistake when used in a dark room.

Figure 5:
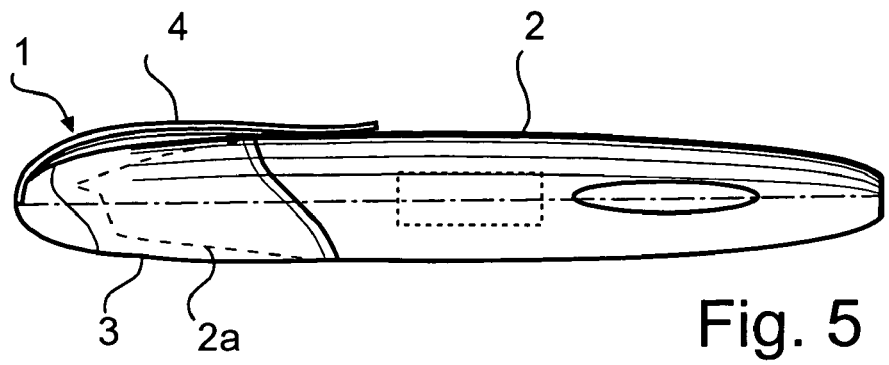
FIGS. 5–8 schematically show further embodiments of the arrangement for sensing the presence or absence of the cap on the pen.

As schematically indicated in FIG. 5, it is also possible to use a motion or vibration sensor 20, such as a linear acceleration sensor, preferably placed in the longitudinal direction of the pen 1, that detects the longitudinal movement of the pen 1 that occurs when the cap 3 and the body 2 are separated and combined, respectively. This may, if necessary, be combined with some sort of sensor that indicates whether the cap 3 is removed or placed on the front end 2a of the pen 1, to make sure that the pen 1 is not activated when the cap 3 is placed on the front end 2a and the pen is moving. For instance, the motion sensor may trigger a light sensor, for example the camera, to sense whether the cap 3 is on or off, to ensure that the pen 1 is not activated by a motion when the cap is placed on the body 2.

Figure 6:
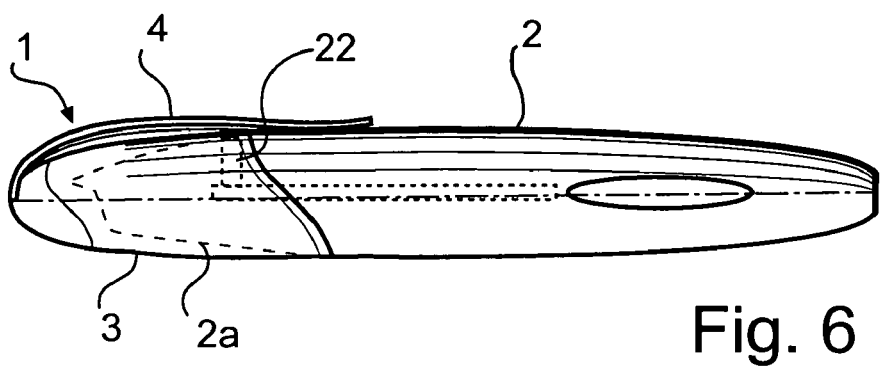

The activation and deactivation of the pen 1 can also be achieved using a mechanical switch 22, which may be arranged in the front end portion 2a of the pen 1, as indicated in FIG. 6. When the cap 3 is removed from the body 2, the switch 22 is released, and this is used to activate the equipment in the pen 1. Examples of such mechanical switches 22 are tilt switches, tip switches, slide switches, push-buttons etc.

Figure 7:
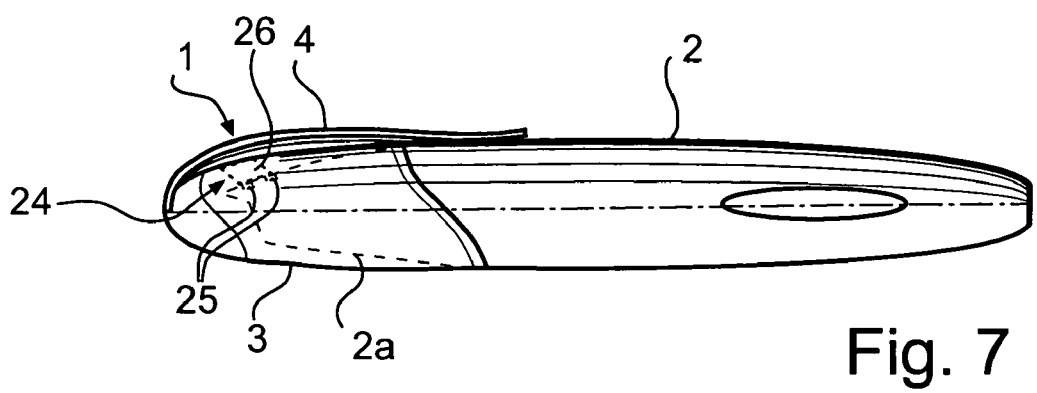

Another way of achieving the activation and deactivation of the pen 1 is to use an electric switch 24, as indicated in FIG. 7. This could, for example, be implemented as two spaced apart metal pins or plates 25 on the surface of the front end portion 2a, and a metal piece 26 on the inside of the cap 3. When the cap 3 is placed on the front end portion 2a, the metal pins or plates 25 and the metal piece 26 in the cap 3 engage and form a closed circuit, and when the cap is removed, the engagement is released, causing an open circuit and a corresponding signal change that initiates the activation process. It is also possible to metallise the entire inside surface of the cap 3, or to use a metal cap 3. As a further alternative, the electric switch 24 may comprise a normally closed circuit which, upon receipt of an insulating element of the cap, may form an open circuit. Thus, removal of the cap may be detected by the electric switch returning to its closed state.

Figure 8:
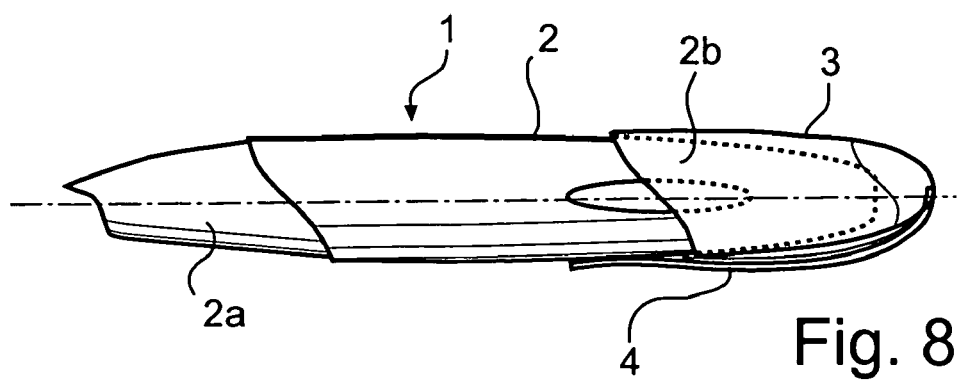

In another embodiment, shown schematically in FIG. 8, the removal of the cap 3 does not activate the pen 1, but instead the placement of the cap 3 on another part of the body 2, e.g. the back end portion 2b opposite to the front end portion 2a, activates the pen 1. In such an embodiment, the pen may be provided with any of the sensor arrangements given by way of example above, with any switches, Hall elements, or other sensors that detects the presence of the cap 4 being arranged in association with this other part of the body 2.

The invention claimed is:

1. An electronic pen having a body, a cap and an actuation device, said actuation device comprising:
    a sensor arrangement comprising a camera which captures images during operation of the pen, wherein the camera further comprises a solid-state imaging device usable for registration of information during operation of said electronic pen, and further wherein the camera also senses presence or absence of said cap on said body, and further wherein said actuation device being operable to activate said electronic pen in response to removal of said cap from said body.

2. An electronic pen according to claim 1, wherein said sensor arrangement further comprises a motion sensor.

3. An electronic pen according to claim 1, wherein said sensor arrangement further comprises a pressure sensor.

4. An electronic pen according to claim 3, further comprising a writing implement and wherein said cap is arranged to cover said writing implement to protect said writing implement when said electronic pen is not in use and said pressure sensor is usable for sensing when said writing implement is pressed against a writing surface.

5. An electronic pen according to claim 1, wherein said sensor arrangement further comprises a vibration sensor.

6. An electronic pen having a body, a cap and an actuation device, said actuation device comprising:
    a sensor arrangement comprising a camera which captures images during operation of the pen, wherein the camera further comprises a solid-state imaging device usable for registration of information during operation of said electronic pen, and further wherein the camera also senses presence or absence of said cap on said body, and further wherein said actuation device being operable to deactivate said electronic pen in response to placement of said cap on said body.

7. An electronic pen according to claim 6, wherein said sensor arrangement further comprises a motion sensor.

8. An electronic pen according to claim 6, wherein said sensor arrangement further comprises a pressure sensor.

9. An electronic pen according to claim 8, further comprising a writing implement and wherein said cap is arranged to cover said writing implement to protect said writing implement when said electronic pen is not in use and said pressure sensor is usable for sensing when said writing implement is pressed against a writing surface.

10. An electronic pen according to claim 6, wherein said sensor arrangement further comprises a vibration sensor.

11. An electronic pen having a body, a cap arranged to protect a front end portion of said body and an actuation device, said actuation device comprising a sensor arrangement for sensing presence or absence of said cap on a portion of said body separated from said front end portion of said body, said actuation device being operable to activate said electronic pen in response to placement of said cap on said portion separated from said front end portion of said body.

12. An electronic pen according to claim 11, wherein said portion separated from said front end portion is a portion opposite to said front end portion.

13. An electronic pen according to claim 11, wherein said sensor arrangement comprises a mechanical switch.

14. An electronic pen according to claim 11, wherein said sensor arrangement comprises components which sense without physical contact.

15. An electronic pen according to claim 14, wherein said sensor arrangement comprises an electric switch.

16. An electronic pen according to claim 14, wherein the components include a first component associated with the cap and a second component associated with the body.

17. An electronic pen according to claim 14, wherein said sensor arrangement comprises a motion sensor.

18. An electronic pen according to claim 14, wherein said sensor arrangement comprises a light sensor.

19. An electronic pen according to claim 14, wherein said sensor arrangement utilizes changes in a magnetic field for detecting the presence or absence of said cap on said body.

20. An electronic pen according to claim 19, wherein said sensor arrangement comprises a reed switch.

21. An electronic pen according to claim 20, wherein said reed switch is arranged in said body and a magnet is arranged in said cap.

22. An electronic pen according to claim 21, wherein said magnet is arranged underneath a clip on said cap.

23. An electronic pen according to claim 19, wherein said sensor arrangement comprises a Hall element.

24. An electronic pen according to claim 23, wherein said Hall element is arranged in said body and a magnet is arranged in said cap.

25. An electronic pen according to claim 24, wherein said magnet is arranged underneath a clip on said cap.

26. An electronic pen according to claim 23, wherein a field concentrator, such as a metal piece, is arranged adjacent to said Hall element to attract a magnetic field of said magnet.

27. An electronic pen according to claim 23, wherein a magnet is arranged adjacent to said Hall element.

28. An electronic pen according to claim 14, wherein said sensor arrangement comprises a vibration sensor.

29. A method of activating an electronic pen having a body and a cap, comprising:
removing said cap from said body;
detecting the absence of said cap using an imaging sensor, wherein the imaging sensor is a solid state camera which provides registration of information during the operation of the electronic pen; and
activating said electronic pen.

30. A method of deactivating an electronic pen having a body and a cap, comprising:
placing said cap on said body;
detecting the presence of said cap using an imaging sensor, wherein the imagine sensor is a solid state camera which provides registration of information during the operation of the electronic pen; and
deactivating said electronic pen.

31. A method of activating an electronic pen having a body, said body having a front end portion, and a cap, comprising:
placing said cap on a portion of said body separated from said front end portion;
detecting the presence of said cap; and
activating said electronic pen.

32. A method according to claim 31, wherein the detecting the presence of said cap comprises determining a change in a magnetic field.

* * * * *